United States Patent [19]
Delacroix et al.

[11] 3,785,764
[45] Jan. 15, 1974

[54] CONTINUOUS MELTING OF VERY HIGH MELTING POINT MATERIALS

[75] Inventors: George Delacroix, Croissy sur Seine; Lucien Beneytout, Martigues, both of France

[73] Assignee: Societe Anonyme, Paris, France

[22] Filed: Aug. 16, 1972

[21] Appl. No.: 281,180

[52] U.S. Cl. .................................. 432/85, 432/116
[51] Int. Cl. ............................................. F27b 19/00
[58] Field of Search ........................ 432/85, 116, 97

[56] References Cited
UNITED STATES PATENTS
2,622,862  12/1952  Jordan ................................. 432/97
207,065  8/1878  Rainage ................................ 432/97

Primary Examiner—John J. Camby
Attorney—Littlepage, Quaintance, Murphy & Dobyns

[57] ABSTRACT

Furnace for continuous melting of very-high melting-point materials fitted with an adjustable feeding system, heated by gaseous or other fuel or electricity, and cooled such as to form on the inner side of the hearth a self-coating, and in which the said hearth is held at least partly in a bath of a liquid coolant such as water and vented to atmosphere and provided on the one hand, with means to keep the level of water constant, and on the other for feeding on the hearth the material to be processed in the shape of an evenly sloping batter, the liquid bath providing, among other things, proper cooling of the contact area between the roof of the furnace and the hearth.

5 Claims, 4 Drawing Figures

CONTINUOUS MELTING OF VERY HIGH MELTING POINT MATERIALS

The invention relates to improvements in continuous melting processes for the manufacture of such materials as silicates or cement clinkers and, more especially, those materials having a very high melting point. The invention relates more specifically, to a furnace involving such improvements.

It is well known that, when molten, such materials corrode more or less the walls of furnaces and hearth chambers in which they are prepared and/or held. Various ways have already been put forward to obviate or, at least, minimize such drawbacks. Initially, use was made in the construction of furnaces or hearth chambers of linings exhibiting high refractory properties which technological progress made available. However, this method was very expensive and did not provide truly dependable results.

It has also been suggested to keep the molten or melted material within thin ceramic walls enclosed within a cooling system, said thin walls preventing reactions between the molten and the melted material and the said ceramic walls, the cooling system consisting of nests of tubes connected to the water inlet and outlet manifolds; in such equipment, the roof and the walls above the molten metal were constructed with refractory ceramic components.

It has further been suggested to set the material to be melted direct against metal walls; in this instance, the electrically-heated furnaces have no upper laboratory above the molten bath. Another furnace of particular interest is one for glass making, the ceramic walls of which are made of castable refractory consisting of zircon, alumina and a binder, and held without any mechanical connection to allow free expansion in a copper enclosure to which are brazed copper tubes wherein water circulates rapidly. These three last types of furnaces are specifically designed for either glass- or ceramic- making by arc heating within the mass of the material to be melted.

Glass-making electric melting furnaces were also designed, in which the refractory wall, (or lined likewise) of the hearth chamber holding the melted glass was cooled to the extent that is was coated with a solid layer of glass. In other words, this is an additional lining consisting of the glass to be derived, this reducing, of course, the wear of the refractory lining of the furnace; this protective lining, which could be termed "self-coating", comes about gradually from the moment the furnace is operated and is self-maintained throughout furnace operation.

When making glass constituents in electric furnaces, the various types of above-mentioned furnaces did bring about some improvements to the life of the refractory ceramic materials used, but affected adversely the manufacturing processes owing to the formation of defects in the glass known as "cords" this requiring thicker refractory ceramic walls and being tantamount to eliminate the "self-coating" process described above together with its potentially desirable features. Another solution, consisting in stirring the bath was suggested in order to do away with or minimize the formation of "cords". All the foregoing techniques call for heavy investments and raise many problems, particularly with regard to leakproofness and maintenance which make very difficult continuous operation in the glass-making industry.

All these cooled furnaces of the prior art include in fact a water- or steam-jacket which calls for large quantities of water without providing dependably the steady cooling required.

However, the performance achieved in the glass-making industry was sufficiently promising to warrant undertaking research and development to take advantage of the self-coating process for continuous and economic manufacture of products exhibiting corrosiveness in course of manufacture and/or melting, e.g., manufacture of refractory cements or products making special materials by providing as far as possible heating by liquid, gaseous or pulverulent fuels.

Our work has confirmed from the outset that the wear of a furnace cooled under conditions known of the prior art were especially marked in the area relating to the upper level of the molten bath. We have also found that in such furnaces and as previous work had set forth, the feed-in method applied known of the prior art included a shaft introducing the cold material more or less vertically into the furnace at fixed intervals did not always suit the processing of materials with high or very high melting points, as there occurs occasionally in the charging hopper a temperature such that the wall of the latter may be subjected to chemical attacks from the material thus slowing down the rate of subsidence and thereby impairing smooth operation. Many feeding devices depending on the condition of the bath or characteristics of either the raw material or end product have been suggested to prevent such cyclical operation; all they achieved was to increase costs without providing a performance acceptable as such. This is one of the reasons for which glass-making self-coating furnaces of the prior art, heated solely either by the heating arc or Joule effect dit not achieve the popularity expected. We have therefore again scrutinized the performance of the furnaces of the prior art and attempted, in investigating the above findings and experience, the feasibility of operating reverberatory furnaces for continuous manufacture of products such as silicates and melted cements whose only features in common with glass is their very high melting point and their marked corrosiveness in the furnaces in which they are processed. We have thus formed that, were specific requirements fulfilled, it was possible, in a reverberatory-type furnace, cooled and involving the self-coating process— whether this furnace be heated electrically or by the combustion of gaseous liquid or solid fuels — to melt, either continuously or not, materials such as those hereinabove mentioned, even if very corrosive to the refractories especially when such materials had a very high melting point.

We have established the surprising fact that, generally speaking, such results could be achieved straightforwardly by dipping the hearth of the furnace up to a level close to that of the molten mass, in a water bath vented to atmosphere. This unexpected finding is at the root of the improvement brought about in accordance with the invention. At this juncture, we have found that melting of metals, especially those with a very high melting point, could be continuously achieved in a reverberatory-type furnace provided with an adjustable feeding system heated either by a gaseous or other fluid, or yet electrically, and cooled so as to form on the inner wall of the hearth self-coating of the processed material. Provided that the hearth be kept at least partly in a bath of a liquid coolant such as water and vented to atmosphere, and the material to be processed be fed-in shaped as an evenly sloping pile. Performance is further improved when provision for liquid-cooling is made at least in the contact area between the roof and the feeding shaft.

An air-jacket to cool the material in the feeding shaft of the furnace may also be provided, this improving heat recuperation.

Such a furnace allows manufacturing continuously melted cements, various silicates, more especially synthetic monocalcium silicates, in accordance with French Patents Nos. 1.584.873 and 69.05.224.

In practice, in its more common form, the reverberatory-type melting furnace in accordance with this invention, which include means for cooling of the metal hearth to allow formation of an internal self-coating, a feed-shaft adjustable at one end and at least one source of heat at the other and one tapping hole for the processed material, is characterized in that the hearth is dipped into the cooling pool and that, on the one hand, in the transition area between the hearth and the laboratory and, on the other hand, between the roof and the lower portion of the feeding shaft a cold mantle is provided, that the said shaft is preferably vertical, of polygonal or circular section, and connected at the top to all the means for feeding the raw material. An air-circulation jacket may be provided around the shaft, cold air being introduced therein for subsequent use as combustion air.

In accordance with other features of the invention, the mantle(s) is (are), as the pool of the hearth, vented to atmosphere, and kept at a constant level. The pool is preferably of such size that in the mass of water therein, water circulates by thermosyphon action.

Cross-section of the shaft is selected such that from the outset, the material to process forms on the hearth of the furnace a sloping pile, called hereinafter the "batter". Melting takes place on this batter which is reformed continuously from the charge in the feeding shaft throughout operation of the furnace.

Means are provided in the shaft for pre-heating the material for a constant and adjustable feed whereby the latter is fed-in smoothly on the batter thereby providing steady melting.

Means, such as actuating cylinders (or any other) are well worth providing to carry the pool and clear the hearth laboratory unit for maintenance purposes. This is one of the features of the invention that should be considered inasmuch it can also be implimented with a fixed pool and a movable furnace unit.

Should a granulated product be required, a suitable direct granulating device may be fitted at the exit of the tapping hole.

A furnace according to the invention, with metal walls not thoroughly lined with refractories and comprising a mantle and a pool has been heated by a burner and supplied with mixtures through the feeding shaft, to derive, in one instance, melted-cement clinker and, in the other synthetic monocalcium silicate. Contrariwise to what previous experience would have led to expect, it was found that, in both cases, the production of clinker, granulated or not, or in slugs, in terms of the procedure selected for the casting procedure, was continuous. Such a performance, unexpected on technical grounds, is hence of great manufacturing interest, both owing to the straightforwardness of the equipment and comparatively low cost as well as the savings and quality of the products derived from continuous operation.

A preferred embodiment of a furnace improved in accordance with the invention is described hereinunder, reference being had to the appendix drawings, in which.

Figure 1:
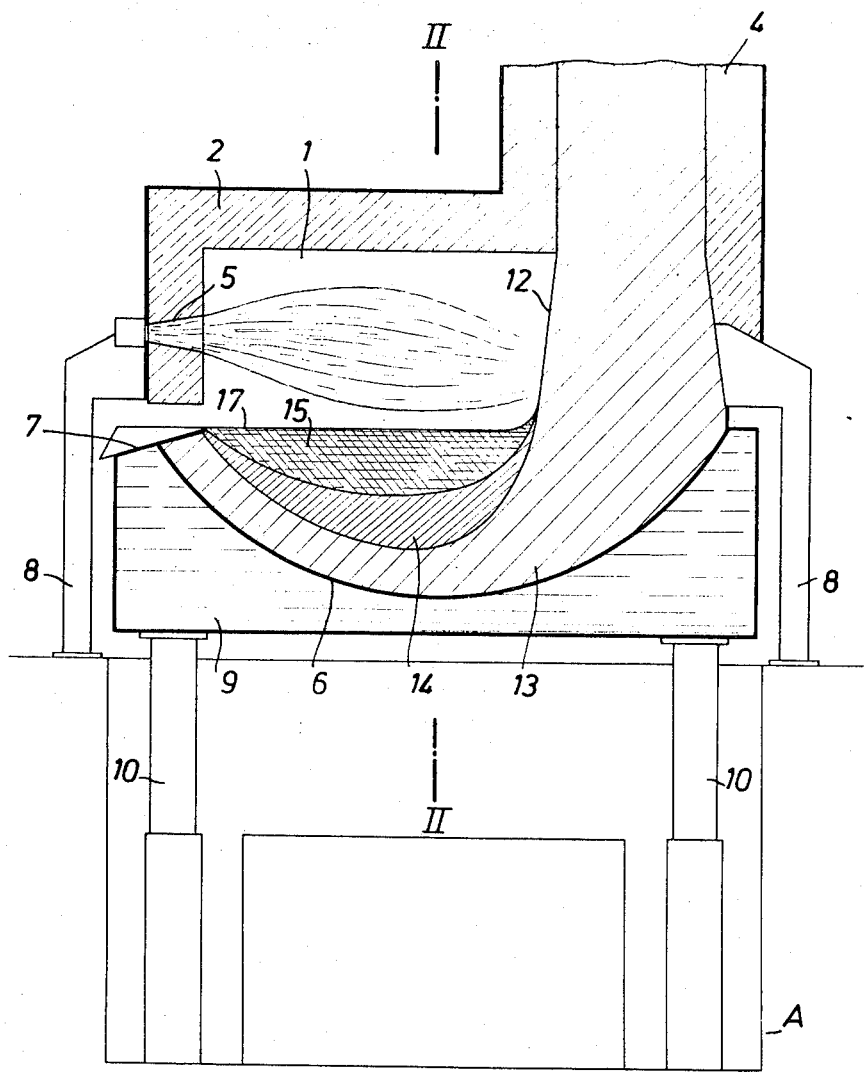
FIG. 1 is a diagrammatical cross-section of a furnace in accordance with the basic principle of the invention.
Figure 2:
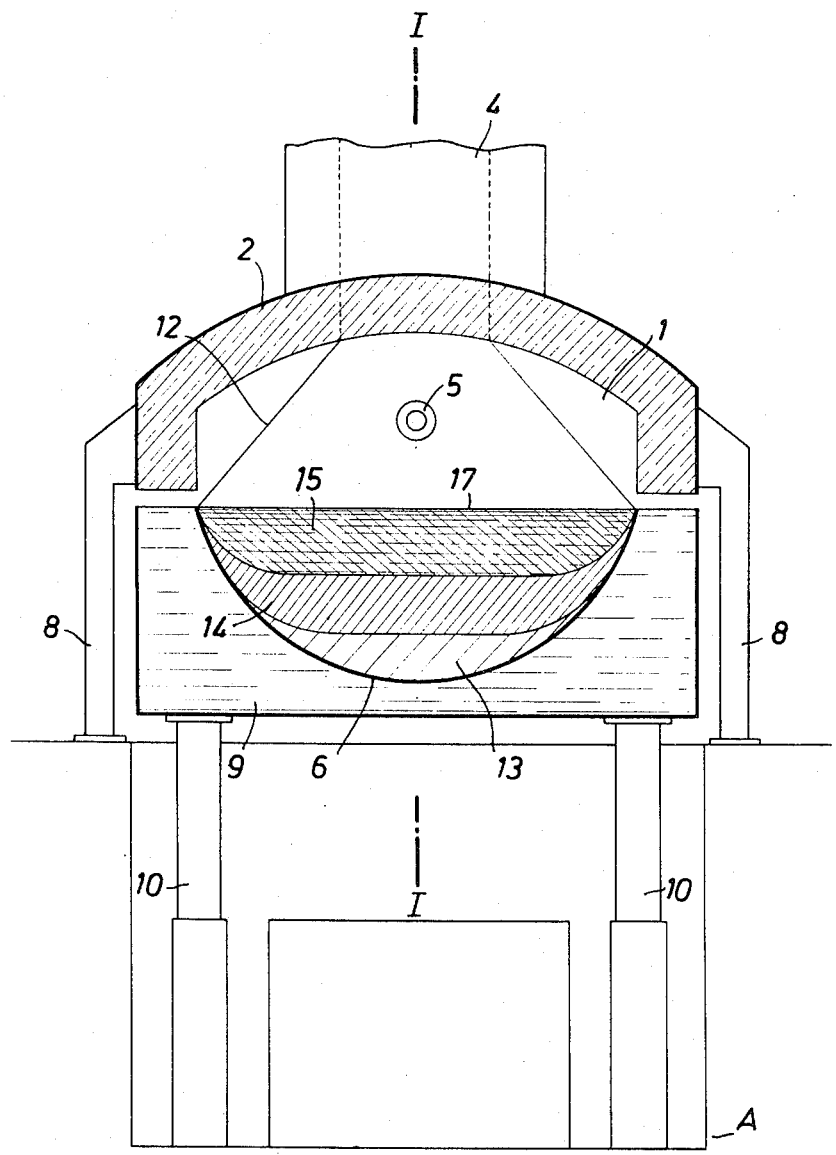
FIG. 2 is a cross-section through line II—II of FIG. 1.

FIGS. 1 and 2 show the laboratory 1 of a furnace consisting of refractory roof 2 with waste-gas flue 3, (not shown) feeding shaft 4 and burner 5, metal hearth 6 with tapping hole 7, the roof and hearth assembly being borne by pillars 8. The pool of water 9 is kept at constant level IX through IX via an inlet and overflow (not shown) and is set on actuating cylinders 10 which, for operating the furnace, keep hearth 6 dipped into water. The upper edge of pool 9 encompasses on the one hand, at $7_1$ tapping hole 7 and on the other hand, pool 9 which forms an L-shaped mantle $9_1$ on which rests roof 2 and providing a cooled seal between roof 2 and hearth 6.

The material 11, crushed or milled, is fed through the feeding shaft 4 and forms on hearth 6 the batter 12, which at the outset of the process, i.e. prior to the furnace charge becoming molten, rests on the bottom of hearth 6. After igniting burner 5, aimed towards the batter area close to the level the molten mass is ultimately to reach, the material begins to melt and gradually spreads over the hearth, forming from the bottom thereof a solid or doughy area 13, a viscous or half-melted area 14 and a liquid area 15, this gradually building-up direct on the inner side of hearth 6 the self-coating protective layer $13_1$, the level of the molten bath rising little by little on the hearth. Once the level 17 has reached tapping hole 7, slugs of melted material or, were applicable, grains of the melted product are collected.

Figure 3:
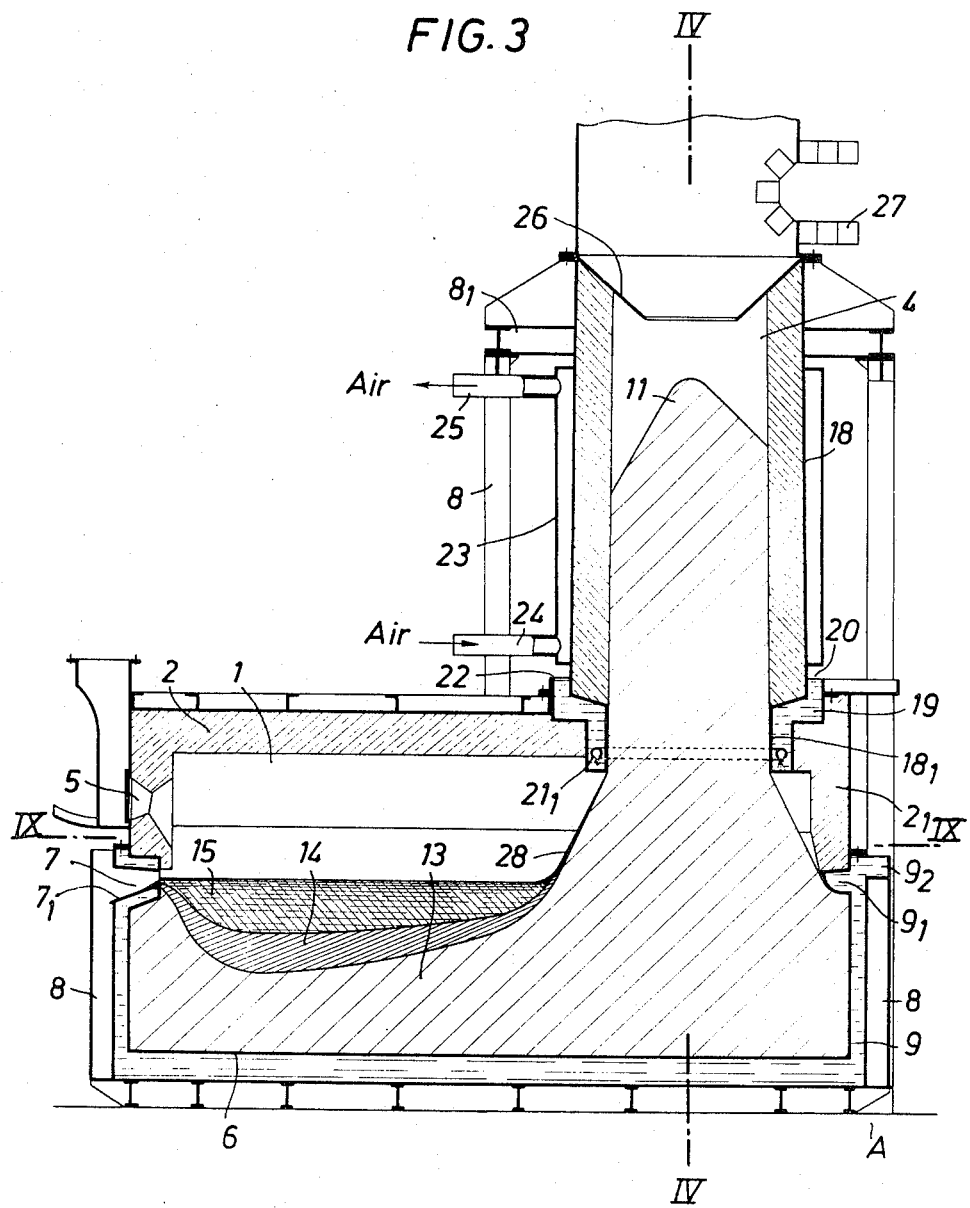
FIGS. 3 and 4 are diagrammatical views of a practicable form, of the furnace, in longitudinal cross-section through line III—III of FIG. 4, and vertical cross-section through line IV—IV of FIG. 3, respectively.
Figure 4:
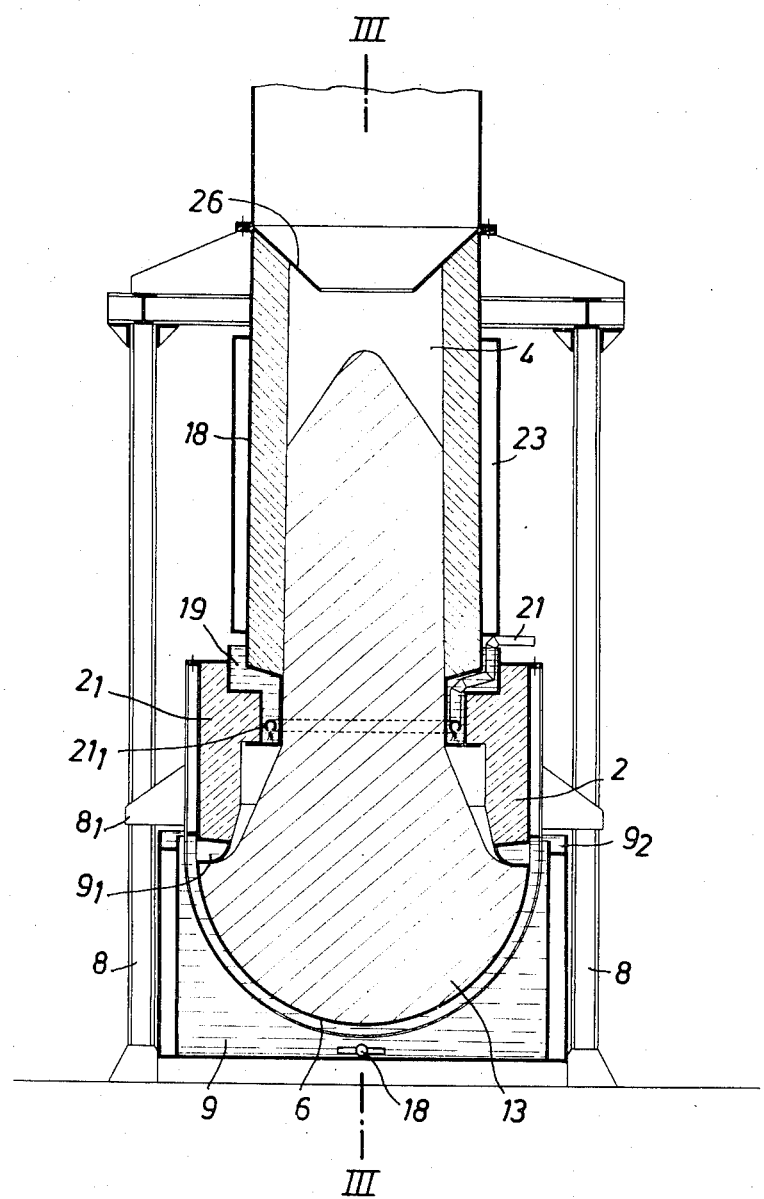

In the embodiment of the invention shown in FIGS. 3 and 4, the furnace comprises the laboratory 1, roof 2, feeding shaft 4, burner 5 and hearth 6.

The shell of the furnace 8 rests on the floor A of a shop and carries, by means of brackets, means and angle-irons $8_1$, the furnace assembly 1 as well as the portion of shaft 4 which feeds direct into the furnace the material to be melted in order to derive the end-product required.

Pool 9 is either free standing or rests on the ground through actuating cylinders, (not shown) housed in a pit; pool 9 surrounds the metal hearth 6, its upper edge being at such a height that the constant level of the water held in the pool surrounds, on the one hand, hole 7 and, on the other the remainder of the furnace circumference throughout, thus forming the mantle $9_1$ above which is roof 2 and under such conditions that there is in this area a cooled seal between roof 2 and hearth 6. Pool 9 is supplied with water through pipe 18 and at least a discharge overflow (not shown) provided through the upper side channel $9_2$ of the pool.

Roof 2 is of conventional refractory. The feeding shaft 4, is vertical (18) and the lower end of the circular lining rests on roof 2 through the rider arch $2_1$ and circular mantle 19 in which water level 20 is kept constant by means of conduit 21, drilled with holes $21_1$ preferably evenly spaced around foot $18_1$ of the feeding shaft, and overflow 22. This arrangement permits of cooling the gases outgoing from the laboratory before they pass through the material to be processed held in vertical shaft 18. To prevent overheating of the material to be melted as set forth above, the shaft is preferably surrounded by air jacket 23, the cold air being fed in at the bottom of the jacket through pipe 24 connected to the outlet of a blower (not shown), the hot air incoming from the jacket through pipe 25 being available as pre-heated combustion air in burner 5.

Above the furnace feeding-shaft 4 assembly, the drawing shows the adjustable hopper 26 whereby the material conveyed there by any suitable means 27 is fed into shaft 18.

Pool 9 and mantle 19 being filled with water at their proper level such a furnace operates as follows :

The crushed material is fed into shaft 18 and drops into furnace 1 forming there batter 28 the lower portion of which spreads over hearth 6. The burner 5 is then ignited and aimed towards the spread surface of the material, this warming up gradually the mass and forming the doughy area 13, viscous area 14 and molten bath 15; area 13 gradually builds up self-coating $13_1$ the level of molten bath 15 gradually rising. Next, the flame of burner 5 is aimed towards the batter of material the upper layer of which melts evenly and flows while keeping up formation of the molten bath.

Once the working level is reached, the melted mass flows through tapping hole 7 to be either collected in ingot moulds moving past, along the furnace, as known in the prior art or granulated direct.

Throughout operation of the furnace, pool 9, mantles $9_1$ and 19 are supplied uninterruptedly with water to keep the water level constant and cool both furnace and material properly in the feeding shaft. Air circulation in jacket 23 is controlled in such a way that the temperature of the material in the shaft is in the region of 1000°C to prevent sticking or even fouling the said shaft.

In continuous operation, a 9 cu.m. furnace, dipping into a 19 cu.m. pool was continuously supplied for production of monocalcium silicate, by melting suitable raw materials at 1450°/1520°C on a batter with a surface of 1.25 sq.m. and operating a 3 sq.m. superheating bath at 1600°/1650°C to secure the viscosity required for the molten bath; the output amounted to 20 metric tons/per day.

Whatever the material to be melted, the furnace in accordance with the invention requires a lower investment than conventional furnaces; in addition, it features, on the one hand, easy maintenance especially when the pool is movable and, on the other hand, provides a vertical feed readily kept constant in properly distributed amounts over the hearth this simplifying the supervision required.

Other valuable features are, among others, full control of the particle-size distribution of the furnace charge since formation of the batter is adjustable from the charging hopper ; feasibility of pre-heating the material through by-passing all or part of the gases in the hopper; less damage to the charge owing to fewer falls of material and lastly, increased self-contained operation thus making for easier manual interventions on the feeding systems.

We claim:

1. A melting furnace for continuous production of very high melting point materials comprising a hearth, a roof covering said hearth, an adjustable feeding system, heating means and cooling means for forming on the inner wall of the hearth a self-coating, said hearth at least partly held in a bath of liquid coolant vented to the atmosphere, means for keeping the level of liquid coolant constant within said bath, and means for feeding the material to be processed on the hearth as an evenly sloping batter, whereby the liquid bath provides proper cooling of the contact area between the roof and the hearth.

2. A furnace according to claim 1 comprising cooling means for the hearth to provide formation of an internal self-coating, an adjustable feeding system at one end of the hearth and at the other, at least one source of heat and a tapping hole for the processed material, a cooling mantle arranged between the roof and the lower portion of the feeding system, said mantle being vented to atmosphere and provided with means for maintaining a constant water level therein, said feeding system comprising a substantially vertical shaft having a lower and upper end, said upper end being connected to hopper means for feeding the raw material.

3. A furnace, according to claim 2, in which an air-circulation jacket is provided around the shaft, including means for cold air introduction at the lower part of said jacket and for exhaust of the air at a higher part thereof.

4. A furnace according to claim 2 in which the cross-section area of the shaft is selected so that the material to be processed forms on the hearth upon putting the furnace in service a tapered batter bearing against an abutment and so that the crushed material fed into the furnace settles on said batter at the top of a molten bath during operation of the furnace.

5. A furnace according to claim 1 in which means are provided to self-maintain the level of material to be processed under such conditions that the level of a resulting molten bath is kept likewise substantially constant on the hearth.

* * * * *

PO-1050
(5/69)

UNITED STATES PATENT OFFICE
CERTIFICATE OF CORRECTION

Patent No. 3,785,764          Dated January 15, 1974

Inventor(s) GEORGES DELACROIX et al

It is certified that error appears in the above-identified patent and that said Letters Patent are hereby corrected as shown below:

[73] Assignee: SOCIETE ANONYME: CIMENTS LAFARGE

Signed and sealed this 2nd day of July 1974.

(SEAL)
Attest:

EDWARD M. FLETCHER, JR.          C. MARSHALL DANN
Attesting Officer                 Commissioner of Patents